United States Patent [19]

Tadauchi et al.

[11] Patent Number: 4,571,573
[45] Date of Patent: Feb. 18, 1986

[54] APPARATUS FOR CONVERTING AN ANALOG SIGNAL TO A BINARY SIGNAL

[75] Inventors: Masaharu Tadauchi; Kunio Sato, both of Hitachi; Kiyohiko Tanno, Katsuta; Hiroshi Suehiro; Yasuo Inoue, both of Yokohama, all of Japan

[73] Assignee: Hitachi, Ltd., Tokyo, Japan

[21] Appl. No.: 435,549

[22] Filed: Oct. 21, 1982

[30] Foreign Application Priority Data

Oct. 27, 1981 [JP] Japan .................... 56-170773

[51] Int. Cl.⁴ .............................................. H04N 1/40
[52] U.S. Cl. ..................... 340/347 AD; 340/347 DA; 358/280; 307/358; 328/151
[58] Field of Search ...................... 382/54, 50, 52, 53; 358/282; 307/358, 354; 330/69; 328/147, 164

[56] References Cited

U.S. PATENT DOCUMENTS

| | | | |
|---|---|---|---|
| 3,599,151 | 8/1971 | Harr | 328/147 |
| 3,911,212 | 10/1975 | Yoshizawa | 382/52 |
| 4,121,121 | 10/1978 | Gabeler | 307/354 |
| 4,217,553 | 8/1980 | Winebarger | 328/164 |
| 4,247,873 | 1/1981 | Decuyper | 358/282 |
| 4,337,455 | 6/1982 | Smith | 382/53 |
| 4,446,486 | 5/1984 | Itoh | 307/358 |
| 4,447,774 | 5/1984 | Stalberg | 328/150 |

OTHER PUBLICATIONS

IBM, Technical Disclosure Bulletin, vol. 20, No. 8, Jan. 1978, pp. 3199, Yount.
IBM, Dynamic Threshold Setting Circuit, Penny, vol. 18, No. 6, Nov. 1975, pp. 1962–1965.

Primary Examiner—Errol A. Krass
Assistant Examiner—Winfield J. Brown, Jr.
Attorney, Agent, or Firm—Antonelli, Terry & Wands

[57] ABSTRACT

An apparatus for converting an analog input signal to a binary output signal, particularly for use in a facsimile system. The apparatus includes a reference level generator having its input terminal supplied with the analog input signal, a signal dividing circuitry connected between the input and output terminals of the reference level generator, an integrator having one end connected with the dividing output terminal of the signal dividing circuitry and the other end connected with a common potential level point in the apparatus and a comparator having one input terminal connected with the signal dividing output terminal of the dividing circuitry and the other input terminal connected with the input terminal of the reference level generator. The reference level on the basis of which the analog input signal is converted to a binary signal is thus adjusted for satisfactory conversion of the signal.

11 Claims, 7 Drawing Figures

APPARATUS FOR CONVERTING AN ANALOG SIGNAL TO A BINARY SIGNAL

BACKGROUND OF THE INVENTION

The present invention relates to an apparatus for converting an analog signal to a binary digital signal.

In a facsimile system or a pattern recognition system, image information of a document sheet is converted to an analog video signal by a document read unit which utilizes a photo-electric conversion device such as a CCD (charge coupled device) line sensor, and the analog video signal is compared with a predetermined reference signal to produce a binary digital signal, which is then processed for transmission over a transmission line. Because of variations of document illumination, light intensity around the periphery of an optical lens and sensitivities of photosensitive elements corresponding to picture cells of the CCD line sensor, an analog video signal produced by the CCD line sensor in the document sheet read unit includes a distortion or "shading" which results in local reduction of the output level. In addition, because of a reduction of the light intensity of a document sheet illumination light source by aging or a change of the background of the document sheet, the absolute value of the amplitude of the analog video signal varies. Thus, when such an analog video signal is compared with the reference signal of a predetermined level to convert it to a binary digital video signal, The digital video signal which represents the image information of the document sheet may not be accurately produced. A signal binary-digitizing processing apparatus which controls the reference signal to compensate for the above-mentioned distortion or the variation of the absolute value has been proposed. For example, reference is to be made to U.S. patent application Ser. No. 151982 filed on May 21, 1980 (corresponding to Japanese Patent Application Laid-Open No. 156475/80 laid-open on Dec. 5, 1980) and U.S. Patent Application Serial No. 260090 filed on May 4, 1981 (corresponding to Japanese Patent Application Laid-Open No. 157575/81 laid-open on Dec. 4, 1981, now U.S. Pat. No. 4,420,742, issued Dec. 13, 1983.

However, such apparatus may not correctly produce a binary digital signal from an analog video signal derived from the document sheet when the document sheet includes (a) a fine or thin pattern, (b) a pattern having repetitive white and black areas at a small interval and/or (c) a pattern having at least one white area in a black area.

FIG. 1 shows an apparatus similar to that shown in FIG. 1 of the copending U.S. patent application Ser. No. 260090 mentioned above. This apparatus is therefore a subject matter of the patent application which had not been publicly known before the priority date of the present application but filed prior to the priority date.

Referring to FIG. 1, a document sheet 10 driven in a direction of an arrow by drive means (not shown) is illuminated by a lamp 11 and a scanning line area extending widthwise of the document (normal to the direction of drive) is imaged on a photo-sensitive plane of a photo-electric converter array 13 through a lens 12. The photo-electric converter array 13 may be a CCD line sensor which may comprise 2048 picture cells. Voltage signals produced in the respective picture cells of the photo-electric array 13 are taken out serially in the order of its cell arrangement and applied to an analog video input terminal 1 as an analog video signal A. Such an analog video signal A usually includes 20–40% shading. Numeral 2 denotes a peak hold circuit which holds a peak value of the analog video signal A applied to the video input terminal 1 and produces an analog peak voltage B. An analog-to-digital converter 3 in a converter circuit 14 receives the analog video signal A for a scan of a white area (at the top portion of the document sheet) and the analog peak voltage B, and produces a digital coded shading profile signal C which is normalized by the analog peak voltage B and supplies the signal C to a memory 4, which stores the normalized shading profile signal C. This signal C corresponds to the above-mentioned "shading" distortion. The normalization is carried out by scaling the voltage of the analog video signal A using the peak voltage B as a reference. Any unit and any scale may be selected. The peak hold circuit 2 produces an instantaneous peak voltage $V_p$ which follows a change in the background of the document sheet. When image information is to be processed, a digital-to-analog converter 5 in the converter circuit 14 receives the normalized shading profile signal C which is read out of the memory 4 and a current value of the analog peak voltage B produced by the peak hold circuit 2 and produces a background voltage D corresponding to white or plain background at that time. By appropriately dividing the background voltage D by a voltage dividing resistor 6, a shading-compensated reference signal $E_1$ is produced. Numeral 7 denotes a comparing circuit which compares the analog video signal A carrying the image information with the reference signal $E_1$ to produce a binary information signal $E_1$ at an output terminal 8. The operations of the photo-electric converter array 13, the peak hold circuit 2 (of a digital type), the memory 4 and the converter 14 including the analog-to-digital converter 3 and the digital-to-analog converter 5 are controlled by timing signals such as a sync signal, a clock signal and/or a reset signal supplied from a control circuit 88. The control circuit 88 may include a clock generator, a sync signal generator and a counter for dividing the frequency of the output of the clock generator to define the repetition frequency of a clock signal to be used. Thus, the controller 88 supplies the sync signal and the clock signal to the array 13 for its operation, the clock signal and a reset signal to the peak hold circuit for its operation, the clock signal to the converters 3 and 5 for their operations and the clock signal to the memory 4 for determining addresses in the memory 4. If the peak hold circuit 2 is of an analog type no timing signal will be necessary.

Referring to the time chart of FIG. 2, the operation of the circuit will now be explained.

The analog information signal A which is produced by repetitively and photo-electrically scanning the document sheet includes background information scan signal trains A-1 and A-2 and pattern information scan signal trains A-3, . . . The background information scan signal train A-1 is applied to the peak hold circuit 2 which holds a peak value thereof and produces a peak hold voltage B at the output. The next incoming background information scan signal train A-2 is normalized by the peak hold voltage B for each picture cell and digitized to produce a shading profile signal C for all picture elements of a scanning line. The normalized digitization may be carried out by digitizing the background information scan signal train A-2 for all the picture elements while putting the peak hold voltage to the most significant digit MSB (a maximum value in digital representation) and a zero volt signal to the least significant digit LSB (a minimum value in digital representation). Alternately, the digitization may be carried out by dividing the background information scan signal train A-2 by the time axis and sampling the divided signals independently, or by sequentially comparing the current picture cell value with the previous picture cell value. The digital signals C are sequentially stored in corresponding addresses of the memory 4. In this manner, the normalized digitization and the storage (storage of the shading profile) of the background information scan signal train (e.g. plain background of the document sheet) are completed.

After the shading profile has been stored, the signal processing system proceeds to the process of converting the analog scan signal train to a binary-level signal. This takes place in response to the detection of a predetermined time after the initiation of the photo-electric conversion of the document sheet or to detection of a predetermined number of scanning lines. In the binary-level conversion operation, the analog scan signal train A-3 carrying the image information is applied to the information input terminal 1. In synchronism therewith, the shading profile digital signals stored at the addresses corresponding to the picture cell positions in the memory 4 are read out and applied to the digital-to-analog converter 5. The digital-to-analog converter 5 also receives the peak-hold voltage B and produces the background voltage D having the possible maximum value at the peak-hold voltage B. By constructing the peak hold circuit 2 such that it always holds a peak value of the current analog scan signal train A, it is possible to produce the background voltage D adapted to the analog scan signal train A-3 even when the plain background of the document sheet varies. The background voltage D thus produced is applied to the voltage dividing resistor 6 which produces a compensated reference voltage $E_1$, which in turn is compared with the analog scan signal train A-3 to produce a binary information signal $F_1$.

However, when information as represented by an analog video signal shown in FIG. 3 is included in the pattern or the image information of the document sheet 10, the image information corresponding to signal portions $P_1$, $P_2$ and $P_3$, that is, a fine or thin line pattern, a white and black repetitive pattern and a white area in a black area is neglected or not correctly converted to a binary digital signal even if the compensated reference signal $E_1$ is used.

SUMMARY OF THE INVENTION

It is an object of the present invention to provide an apparatus for converting an analog signal to a binary digital signal which can correctly convert information contained in the analog signal to the binary digital signal.

In accordance with one aspect of the present invention, there are provided circuit means for producing a background signal for an analog video signal, circuit means for dividing the background signal to produce a reference signal, circuit means for dividing a difference between the analog reference signal and an input analog signal to produce a correction signal, circuit means for adding the correction signal to the reference signal when the input analog signal is larger than the reference signal and subtracting the correction signal from the reference signal when the input analog signal is smaller than the reference signal to vary the reference signal depending on the image information included in the analog signal, integration circuit means for suppressing an abrupt or rapid change of the amplitude of the corrected reference signal to produce a modified reference signal, and compare circuit means for converting the input analog signal to a binary digital signal by comparing it with the modified reference signal to correctly convert the image information contained in the analog signal to the binary digital signal.

DESCRIPTION OF THE PREFERRED EMBODIMENTS

Figure 1:
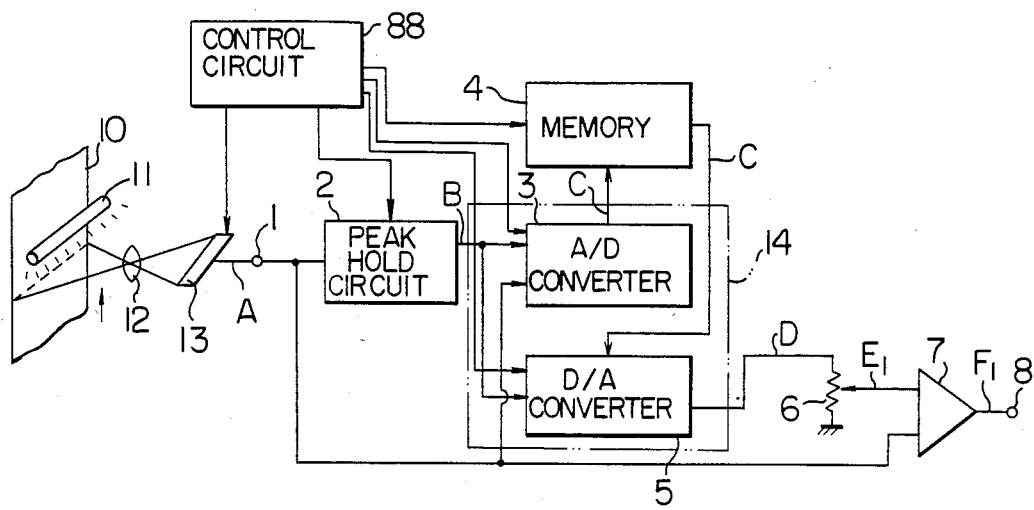
FIG. 1 is a block diagram of an apparatus similar to a signal processing apparatus disclosed in the copending U.S. patent application Ser. No. 260,090.
Figure 2:
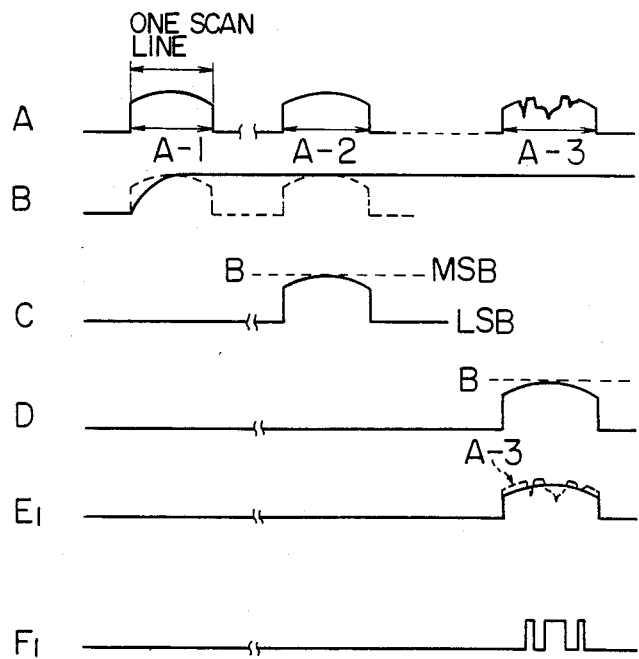
FIGS. 2 and 3 are operational waveform diagrams of the apparatus of FIG. 1.

One embodiment of the present invention will now be explained with reference to the block diagram of FIG. 4 and signal waveforms shown in FIG. 5, in which the present invention is implemented as a facsimile system. The like elements to those shown in FIG. 1 are designated by like numerals and detailed description thereof is omitted.

A peak hold circuit 2 holds a maximum level of an all-white or a background analog video signal $A_1$ and produces a peak hold voltage B representing the maximum level. An A/D converter 3 of an A/D·D/A convert circuit 14 compares the next all-white or background analog video signal $A_2$ with the peak hold voltage B to produce a digital shading profile signal C which represents a distortion characteristic, which signal is stored in a memory 4. When an analog video signal $A_x$ which contains image or pattern information is to be converted to a binary digital signal, a D/A converter 5 refers to the peak hold voltage B of the peak hold circuit 2 which holds the maximum level of an analog video signal $A_{x-1}$ in a previous scan cycle and reads out a digital signal C representing the distortion characteristic of a picture cell to be converted to the binary digital signal from the memory 4 to produce a background signal D. A first voltage dividing resistor 20 divides the background signal D (which is typically a voltage signal) to produce an analog reference signal voltage $E_1$. The arrangement and operation of the elements 1–5 so far described are similar to those of FIG. 1. Accordingly, specific circuit configurations of the peak hold circuit 2, A/D converter 3 and D/A converter 5 may be those shown in the copending Application Ser. No. 260,090.

The output terminal of the first voltage dividing resistor 20 is connected to the non-inverting input terminal of an operational amplifier 21 having an output terminal thereof connected to its inverting input terminal. The operational amplifier 21 forms a voltage follower which reproduces an input reference signal $E_1$ at its output terminal with a low output impedance. A second voltage-dividing resistor 22 is connected between the output terminal of the operational amplifier 21 and an analog video input terminal 1. In the present embodiment, it comprises two series-connected resistors $R_1$ and $R_2$. An integration capacitor 23 is connected in parallel with the resistor $R_1$ of the dividing resistor 22. A comparing circuit 24 receives a modified reference voltage, that is, a comparison reference signal voltage $E_2$ produced at the output terminal of the second voltage dividing resistor 22 and the analog video signal $A_x$ which includes the image information, compares the magnitudes of those input signals, and produces a low level digital video signal $F_2$ representing white or background information when the analog video signal $A_x$ is larger than the comparison reference signal $E_2$ and produces a high level digital video signal $F_2$ representing black or pattern information when the analog video signal $A_x$ is smaller than the comparison reference signal $E_2$.

Figure 3:
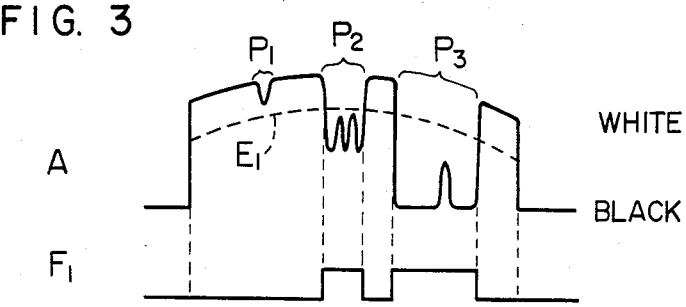

In accordance with such binary digitization conversion apparatus, when the analog video signal $A_x$ is larger than the reference signal voltage $E_1$, the voltage across the resistor $R_1$ of the second voltage dividing resistor 22 which divides the voltage difference between those signal voltages, that is, a correction voltage is added to the reference signal voltage $E_1$ to produce the relatively high level comparison reference signal voltage $E_2$ so that the fine line image information $P_1$ contained in the analog video signal $A_x$ is correctly converted to the binary digital signal. When the white and black repetitive image information $P_2$ is contained in the analog video signal $A_x$, the analog video signal $A_x$ is smaller than the reference signal voltage $E_1$ so that the correction voltage appears across the resistor $R_1$ of the second voltage dividing resistor 22 in a polarity to lower the reference voltage $E_1$. For the image information $P_2$, the analog video signal $A_x$ is oscillating. Accordingly, it is integrated by the capacitor 23 to produce an intermediate level comparison reference signal $E_2$ so that the white and black repetitive image information $P_2$ can be correctly converted to the binary digital signal. For the image information $P_3$ which represents the white line in the black background, the analog video signal $A_x$ is smaller than the reference signal voltage $E_1$ so that the correction voltage appears across the resistor $R_1$ of the second voltage dividing resistor 22 in a polarity to reduce the reference signal voltage $E_1$. In this case, the capacitor 23 is fully charged to a stable state so that the comparison reference signal voltage $E_2$ assumes the low level and the white fine line image information $P_3$ can be correctly converted to the binary digital signal. It is apparent from the comparison of the signal waveforms of FIGS. 3 and 5 that the digital video signal $F_2$ thus produced correctly represents the analog video signal $A_x$.

In the above explanation, it was assumed that the background signal is distorted. The background density signal may be produced by a prefixed distortion signal generator instead of storing the all-white or background analog video signal. Further, the integration capacitor 23 may be connected between the junction point of the second voltage dividing resistor 22 and a common potential point in the apparatus such as a ground point as shown by a dotted line in order to attain a similar effect.

The present invention can be applied to convert an analog video signal having a non-distorted background signal to a binary digital signal. In this case, a voltage derived from a D.C. power supply corresponding to the background signal voltage may be divided to produce a constant magnitude reference signal voltage $E_1$.

Figure 4:
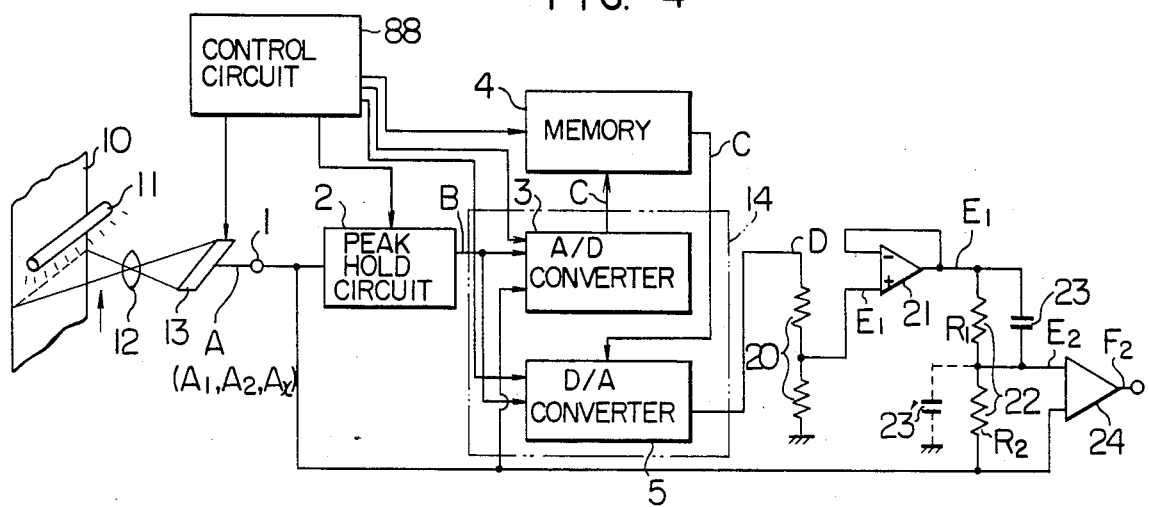
FIG. 4 shows one embodiment of the present invention.
Figure 5:
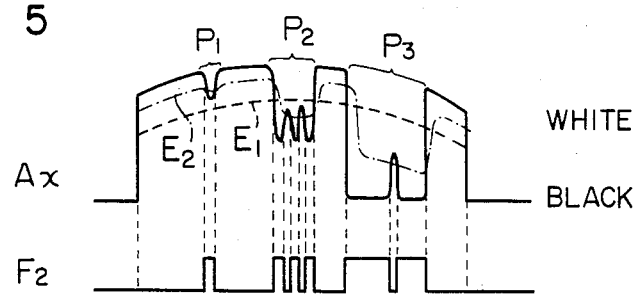
FIG. 5 shows waveforms used to explain the operation of the embodiment of FIG. 4.
Figure 6A:
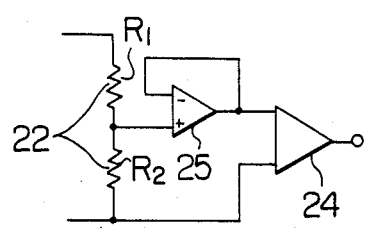
FIGS. 6A and 6B show partial modifications of the embodiment of FIG. 4.

Furthermore, as shown in FIG. 6A, instead of the integration capacitor 23 shown in FIG. 4, a low operation speed operational amplifier 25 may be inserted between the junction point of the resistors $R_1$ and $R_2$ and the comparator 24 and the non-inverting input terminal thereof may be connected to the junction point of the resistors, the inverting input terminal thereof being connected to the output terminal thereof and the output terminal thereof being connected to one input terminal of the comparator 24.

Figure 6B:
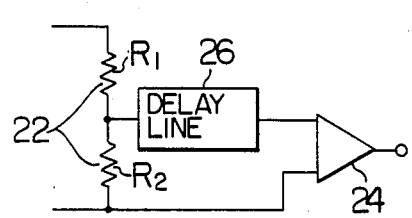

Further, in a modified form as shown in Fig. 6B, instead of the integration capacitor 23 shown in FIG. 4, a delay line 26 may be connected between the junction point of the resistors $R_1$ and $R_2$ and one input terminal of the comparator 24.

We claim:

1. An apparatus for converting an analog input signal having a component corresponding to a background and shading profile to a binary output signal, comprising:

means for producing at its output terminal an analog reference signal from said analog input signal received at its input terminal, said analog reference signal being determined on the basis of said background and shading profile component of said analog input signal;

means connected with said analog reference signal producing means for detecting the difference in amplitude between said analog input signal and said analog reference signal and for dividing said difference to produce a correction signal;

comparison reference signal producing means including first means connected with said difference detecting and dividing means for adding to or subtracting from said analog reference signal said correction signal depending on whether the amplitude of said input signal is larger or smaller than that of said analog reference signal to adjust said analog reference signal and second means for suppressing and delaying any rapid change of the so adjusted analog reference signal, thereby producing a comparison reference signal; and means for comparing the amplitude of said input signal with that of said comparison reference signal to generate said binary output signal.

2. An apparatus according to claim 1, in which said first means in said comparison reference signal producing means includes a series circuit of resistors connected between said input and output terminals of said reference signal producing means, a signal appearing from the junction of said resistors being fed as said comparison reference signal to said comparing means.

3. An apparatus according to claim 1, in which said second means in said comparison reference signal producing means includes an integrating capacitor.

4. An apparatus according to claim 1, in which said second means in said comparison reference signal producing means includes a low speed operational amplifier having its inverted input terminal connected with its output terminal to constitute a negative feedback path.

5. An apparatus according to claim 1, in which said second means in said comparison reference signal producing means includes a delay line.

6. An apparatus for converting an analog input signal to a binary output signal, comprising:

means for detecting a peak value of said analog input signal;

means responsive to the output of said peak value detecting means for producing an analog reference signal;

means for modifying the amplitude of said analog reference signal in dependence upon variations of the amplitude of said analog input signal; and means having first and second input terminals connected to receive the output signal of said modifying means and said analog input signal, respectively, for comparing said signals with each other to generate said binary signal, in which said modifying means includes signal dividing means connected between the output of said reference signal producing means and said second input terminal of said comparing means, said signal dividing means having a signal dividing output terminal connected with said first input terminal of said comparing means, and includes integrating means for suppressing any rapid change of the output from the dividing output terminal of said signal dividing means.

7. An apparatus according to claim 6, in which said signal dividing means includes a series connection of resistors with said dividing output terminal being constituted by the junction of said resistors and said integrating means includes a capacitor connected between said junction of said resistors and ground.

8. A scan signal processing apparatus for converting an analog scan signal into a binary signal, said analog scan signal including a shading profile substantially common to each scan line, comprising:

input means for supplying said analog scan signal;

peak hold means connected to said input means for detecting a peak of the analog scan signal and for holding a corresponding peak value thereof;

first means connected to said input means and said peak hold means for producing an analog reference signal having a waveform based on said shading profile;

a voltage divider connected between the outputs of said input means and said first means for producing at an intermediate output terminal thereof a comparison reference signal whose level is maintained between the levels of said analog scan signal and said analog reference signal;

second means connected to the output terminal of said voltage divider for suppressing rapid changes in said comparison reference signal; and comparison means connected to the output of said input means and said second means for comparing the amplitude of said analog scan signal to that of said comparison reference signal to generate said binary signal.

9. An apparatus according to claim 8, wherein said second means includes an integrating capacitor.

10. An apparatus according to claim 8, wherein said secodd means includes a low speed operational amplifier.

11. An apparatus according to claim 8, wherein said second means includes a delay line.

* * * * *